United States Patent Office 2,739,574
Patented Mar. 27, 1956

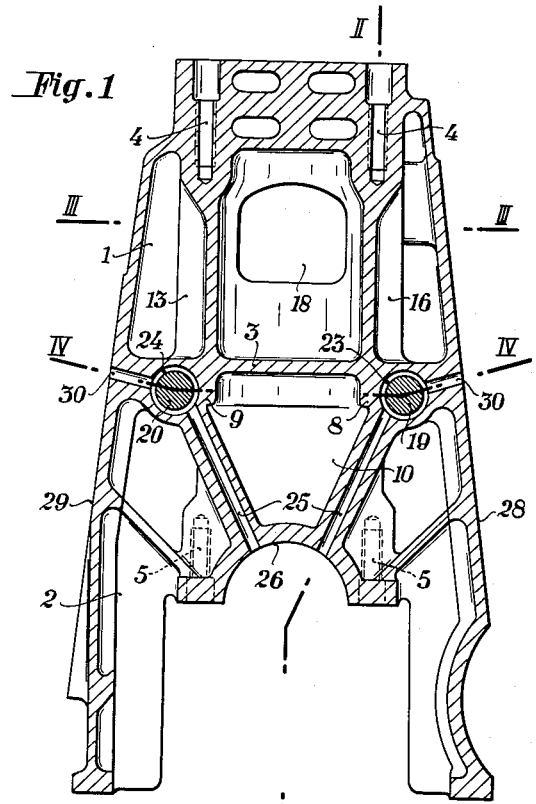

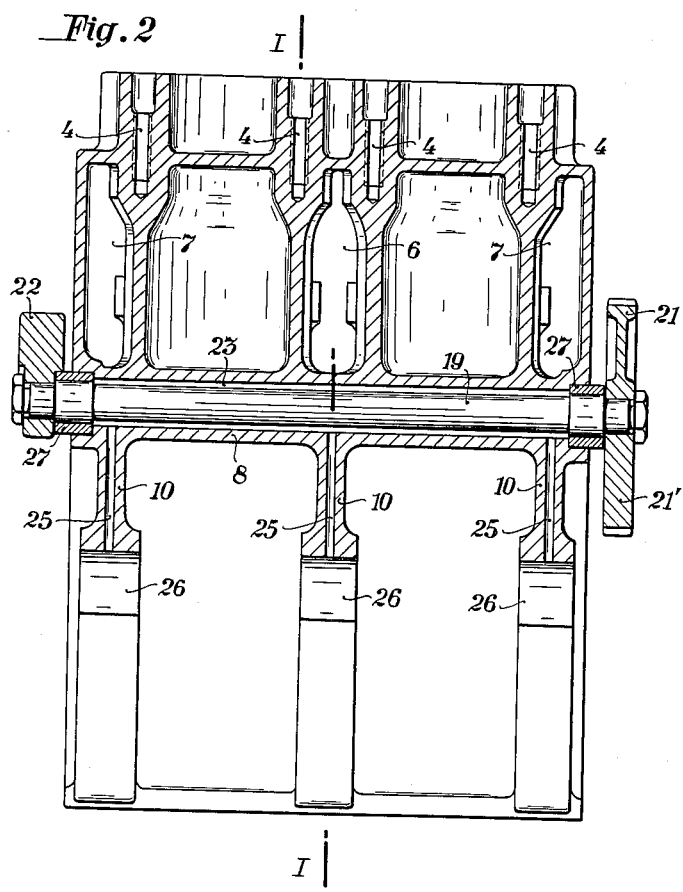
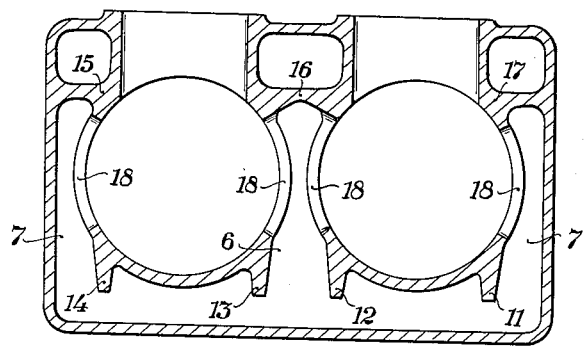

2,739,574

ENGINE HOUSING FOR INTERNAL-COMBUSTION ENGINES

Andreas Scheiterlein, Graz, Austria, assignor to Gustav Ospelt, Vaduz, Liechtenstein Application December 29, 1952, Serial No. 328,332

Claims priority, application Austria January 15, 1952

6 Claims. (Cl. 121—194)

The invention relates to an engine housing which consists of one part and comprises the cylinder block and the crankcase, for internal-combustion engines having upright cylinders arranged in at least one row. It is known to transmit in such engine housings the combustion forces from the cylinder head screws to the screws of the crankshaft bearings or into the bearing walls by means of ties extending inside the housing and being integral therewith. To avoid in a housing thus constructed larger bending stresses upon the ties, the cylinder head screws must be arranged as closely as possible to that cross-sectional plane of the engine in which the bearing supports, e. g., the bearing walls of the crankcase are situated. Particularly in two-stroke cycle engines having intake and exhaust ports controlled by the piston, this is not possible owing to the accommodation of the scavenging duct.

In this connection light metal housings involve the risk that the ties are not stressed uniformly over their cross section owing to the low modulus of elasticity of the material, but that the parts closer to the forces acting thereupon are stressed more highly than the parts which are more remote.

The invention has as its object to remove these difficulties and essentially resides in the fact that through the intermediary of beamlike stiffening members extending transveresly to the ties and in the axial direction of the crankshaft substantially throughout the length of the crankcase, the ties are connected to the bearing supports, e. g., the bearing walls, of the crankcase, which bearing supports are staggered or offset relative to the ties. Such beamlike stiffening members which extend substantially throughout the whole length of the engine housing, e. g., between the crankcase and the cylinder block, and which have connected to them on the one hand the ties and on the other hand the bearing supports in different transverse planes of the engine housing, provide for a favourable construction resistant to bending and ensure above all a transmission of force from the ties to the bearing walls or the like without bending stress on the ties. These stiffening members may be formed by beamlike ribs or thickenings of a wall shutting off the crankcase towards the cylinder block.

Hence the invention enables the arrangement of the cylinder head screws and ties highly independently of the arrangement of the crankshaft bearings and in adaptation to the housing design, in particular, without causing an interference with the scavenging ducts, whereas there are no bending forces in the ties that would endanger their function. Hence, such construction is useful in particular in two-stroke cycle engines with a light metal housing.

According to a preferred embodiment of the invention these beamlike ribs are hollow and utilized as passages for shafts for mass balancing. This hollow construction ensures on the one hand a high bending strength of the stiffening members while avoiding greater concentrations of material, and on the other hand they provide a favourable, efficient accommodation of the balancing shafts. In that case the spaces accommodating the shafts may communicate through lubricating ducts with the crankshaft bearings, on the one hand to supply lubricant to the bearings of the balancing shafts, and on the other hand to utilize these spaces as oil distributing spaces for the lubrication of accessories. E. g. a Roots blower or the like may be supplied from these spaces with lubricant, simply by providing an oil supply bore from the connecting surface of the Roots blower to the hollow space.

In the drawing the invention is illustrated diagrammatically with reference to an example.

Fig. 1 is a cross-sectional view of the engine housing of a two-stroke cycle engine, taken according to the line I—I of Fig. 2.

Fig. 2 is a longitudinal sectional view taken along line II—II of Fig. 1, and

Figs. 3 and 4 are sectional views taken along lines III—III and IV—IV, respectively, of Fig. 1.

The engine housing consisting of a one-part casting comprises the cylinder block 1 and the crankcase 2, which are shut off from each other by a horizontal wall 3. The tapped holes 4 arranged in the engine housing serve for the attachment of the cylinder head, which is not shown.

The combustion forces occurring in the cylinders act on the one hand through the crank assembly on the crankshaft bearings and on the bearing screws screwed into the tapped holes 5, respectively, and on the other hand on the cylinder head and on the cylinder head screws screwed into the tapped holes 4, respectively. For this reason, the tapped holes 4 of the cylinder head screws are stiffened by ties relative to the tapped holes 5 of the bearing screws. As shown in Fig. 2 of the drawing, the tapped holes 4 of the cylinder head screws are not in one cross-sectional plane with the tapped holes 5 of the bearing screws, because the scavenging ducts 6 and 7 must be kept free. For this reason beamlike stiffening members 8 and 9 extending in the axial direction of the crankshaft are provided, which have connected to them on the one hand the ties and on the other hand the bearing carriers consisting of the bearing walls 10. Designated with 11, 12, 13, 14, 15, 16 and 17, the ties are of different cross-sectional shape, which is adapted in each case to the shape of the housing. These ties form at the same time the guide surfaces for the cylinder liners. The beamlike stiffening members 8 extend throughout the whole length of the engine and are effective between the ties 11—17 on the one hand and the bearing walls 10 on the other hand as intermediate members resistant to bending. The same are offset with respect to ties 11—17. Thus the ties as well as the bearing walls are protected from bending stresses in spite of their arrangement in different cross-sectional planes of the engine housing. The scavenging ducts 6 and 7 are connected through openings 18 in the housing with scavenging ports of the cylinder liners, which are not shown.

As is shown in the drawing, the beamlike stiffening members 8 and 9 consist of ribs or thickenings of the wall 3, which shuts off the crankcase 2 against the cylinder block. These beamlike stiffening members 8, 9 are hollow and serve to accommodate balancing shafts 19, 20, which have each at one end a drive gear 21 with balancing masses 21', and at the other end a balancing weight 22 staggered by 180 degrees from the balancing mass 21'. The cavities 23, 24 accommodating these shafts communicate through lubricating ducts 25 with the crankshaft bearings 26 and are filled with lubricating oil supplied from the crankshaft bearings 26. Thus the lubrication of the bearings 27 of the balancing shafts 19, 20 is ensured.

On the outside the engine housing has connecting surfaces 28, 29 for auxiliary machines of the engine, such as a Roots blower. In that case such auxiliary machines may be supplied with lubricant through lubricating ducts 30, which beginning at the cavities 23, 24 discharge at these connecting surfaces 28, 29 whereas the connecting flanges of the adjuncts have analogous lubricating bores.

I claim:

1. In a two-cycle internal combustion engine housing construction including at least one cylinder row, the one-piece combination comprising a cylinder block having at its upper end tapped holes for screws securing cylinder heads, a crank case at the lower engine housing end, bearing supports above the crank case and having holes for screws securing crank shaft bearings and offset with respect to the holes for screws securing cylinder heads, ties in staggered or offset relation to the bearing supports and connected to the cylinder block adjacent to the cylinder head holes, and beamlike thickened portions between the ties and bearing supports and extending throughout the engine housing axially thereof.

2. The one-piece housing combination according to claim 1 and also comprising a wall separating the crank case from the cylinder block and connected to the thickened portions.

3. The one-piece housing combination according to claim 1 and also including walls connecting the thickened portions with the bearing supports and extending perpendicularly to the crank shaft axis.

4. The one-piece housing combination according to claim 1 and wherein the thickened portions are hollow beams and also comprising balancing shafts each located in the hollow of a thickened portion.

5. The one-piece housing combination according to claim 4 and wherein the beam hollows are provided with bearings for the balancing shafts and also comprising walls having lubricating ducts connecting the crank case and balancing shaft bearings.

6. The one-piece housing combination according to claim 5 and wherein the housing has bores communicating with the hollows and includes walls through which the boers open and for adjuncts to supply same with lubricant from the hollows.

References Cited in the file of this patent

UNITED STATES PATENTS

| | | |
|---|---|---|
| 1,720,625 | Chorlton | July 9, 1929 |
| 1,725,955 | Chorlton | Aug. 27, 1929 |
| 1,916,292 | Woolson | July 4, 1933 |
| 2,632,340 | Dolza et al. | Mar. 24, 1953 |
| 2,681,054 | Boghossian | June 15, 1954 |

FOREIGN PATENTS

| | | |
|---|---|---|
| 106,297 | Switzerland | Aug. 16, 1924 |